(12) United States Patent
Osaki et al.

(10) Patent No.: US 10,464,523 B2
(45) Date of Patent: Nov. 5, 2019

(54) WEBBING TAKE-UP DEVICE (71) Applicant: KABUSHIKI KAISHA TOKAI-RIKA-DENKI-SEISAKUSHO, Aichi-ken (JP)

(72) Inventors: Takahiro Osaki, Aichi-ken (JP); Yuya Nagata, Aichi-ken (JP); Tomonari Umakoshi, Aichi-ken (JP); Takuhiro Saito, Aichi-ken (JP)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 258 days.

(21) Appl. No.: 15/629,998

(22) Filed: Jun. 22, 2017

(65) Prior Publication Data

US 2017/0369030 A1 Dec. 28, 2017

(30) Foreign Application Priority Data

Jun. 24, 2016 (JP) .................................. 2016-125627

(51) Int. Cl.
*B60R 22/44* (2006.01)
*B60R 22/46* (2006.01)
*B60R 22/28* (2006.01)
*B60R 22/34* (2006.01)

(52) U.S. Cl.
CPC .............. *B60R 22/46* (2013.01); *B60R 22/44* (2013.01); *B60R 2022/287* (2013.01); *B60R 2022/288* (2013.01); *B60R 2022/3424* (2013.01); *B60R 2022/4406* (2013.01); *B60R 2022/468* (2013.01)

(58) Field of Classification Search
CPC .... B60R 22/44; B60R 22/46; B60R 2022/468
See application file for complete search history.

(56) References Cited

U.S. PATENT DOCUMENTS

2013/0087649 A1* 4/2013 Saito ...................... B60R 22/44
242/371
2013/0341451 A1* 12/2013 Saito ...................... B60R 22/46
242/381.5

FOREIGN PATENT DOCUMENTS

JP 2007-076636 A 3/2007
JP 2014-004853 A 1/2014

OTHER PUBLICATIONS

Office Action issued in the corresponding Japanese Application dated Jun. 6, 2017.

* cited by examiner

*Primary Examiner* — Sang K Kim
(74) *Attorney, Agent, or Firm* — Roberts Mlotkowski Safran Cole & Calderon P.C.

(57) ABSTRACT

In a webbing take-up device, an angle from one end portion toward another end portion of a second clutch spring in a direction of winding of a coil portion from the one end portion toward the another end portion of the second clutch spring is 270°. Therefore, in a case in which the one end portion of the second clutch spring is rotated toward a side of the direction of the winding of the coil portion, one end side portion of the second clutch spring is displaced so as to bulge-out toward a side opposite to a side toward which another end side portion bulges-out.

5 Claims, 5 Drawing Sheets

WEBBING TAKE-UP DEVICE

CROSS-REFERENCE TO RELATED APPLICATION

This application claims priority under 35 USC 119 from Japanese Patent Application No. 2016-125627 filed Jun. 24, 2016, the disclosure of which is incorporated by reference herein.

BACKGROUND

Field of the Invention

The present invention relates to a webbing take-up device that can transmit and cut-off rotational force to a spool or rotational force from a spool by a clutch member.

Related Art

For example, there is a webbing take-up device that, by operating a clutch that is provided between a motor and a spool, can transmit rotational force between the motor and the spool, or can cut-off the transmission of rotational force between the motor and the spool. Further, as the clutch of such a webbing take-up device, there is a clutch of a structure in which a coil-shaped clutch member is provided at the inner side of a ring-shaped gear (Japanese Patent Application Laid-Open (JP-A) No. 2014-4853).

In this type of clutch, when the coil-shaped clutch member is displaced so as to bulge-out toward the radial direction outer side due to one end portion being moved in the peripheral direction with respect to another end portion of the clutch member, the clutch member abuts the inner side portion of the ring-shaped gear. Due thereto, the rotational force that is inputted to the clutch member is transmitted to the gear. In such a structure, there is a case in which displacement, which is such that the clutch member bulges-out at the time when the one end portion of the clutch member is moved in the peripheral direction with respect to the another end portion, is offset in a specific direction.

SUMMARY

In view of the above-described circumstances, there is provided a webbing take-up device that can suppress displacement of a clutch member being offset in a specific direction.

A webbing take-up device of a first aspect includes: a clutch member having a coil shape and, due to rotational force being inputted to the clutch member, one end portion of the clutch member being displaced toward one side in a peripheral direction of the clutch member with respect to another end portion of the clutch member, another end side portion of the clutch member being displaced toward another side in a radial direction of the clutch member, and one end side portion of the clutch member being displaced toward one side in the radial direction, which is opposite to the another side in the radial direction; a rotating member, at whose inner side the clutch member is disposed, that is abutted by the one end side portion and the another end side portion of the clutch member, which have been displaced toward the one side in the radial direction and the another side in the radial direction, respectively, and to which the rotational force is transmitted via the clutch member; and a spool that takes up the webbing by being rotated in a take-up direction, and that enables transmission of rotational force between the spool and the rotating member or the one end portion of the clutch member.

At the webbing take-up device of the first aspect, due to the one end portion of the clutch member being displaced toward a peripheral direction one side with respect to the another end portion, the another end side portion of the clutch member is displaced toward the radial direction another side, and the one end side portion of the clutch member is displaced toward the radial direction one side, which is opposite to the radial direction another side. Therefore, the clutch member being displaced in a manner of being offset in a specific direction can be suppressed.

In a webbing take-up device of a second aspect, in the webbing take-up device of the first aspect, an angle of the one end portion with respect to the another end portion of the clutch member in a direction of winding of the clutch member from the one end portion toward the another end portion of the clutch member is greater than or equal to 270° and less than or equal to 360°.

In the webbing take-up device of the second aspect, the angle of the one end portion of the clutch member with respect to the another end portion in the direction of winding of the clutch member from the one end portion toward the another end portion of the clutch member is greater than or equal to 270° and less than or equal to 360° (preferably, less than 360°). Therefore, the one end side portion of the clutch member can be displaced greatly toward the opposite side in the displacement direction of the another end side portion.

In the webbing take-up device of the first aspect or the second aspect, the one end side portion is a portion in a range of a predetermined angle from the one end portion toward a direction of winding of the clutch member from the one end portion toward the another end portion, and the another end side portion is a portion in a range of a predetermined angle from the another end portion toward a direction of winding of the clutch member from the another end portion toward the one end portion.

As described above, in the webbing take-up device relating to the aspects, displacement of the clutch member being offset in a specific direction can be suppressed.

BRIEF DESCRIPTION OF DRAWINGS

Exemplary embodiment will be described in detail with reference to the following figures, wherein.

DETAILED DESCRIPTION

An exemplary embodiment is described next on the basis of the respective drawings of FIG. 1 to FIG. 6. Note that arrow FR in the respective drawings indicates the front side of a vehicle to which a present webbing take-up device 10 is applied, arrow OUT indicates a vehicle transverse direction outer side, and arrow UP indicates the vehicle upper side.

(Structure of Present Exemplary Embodiment)

Figure 1:
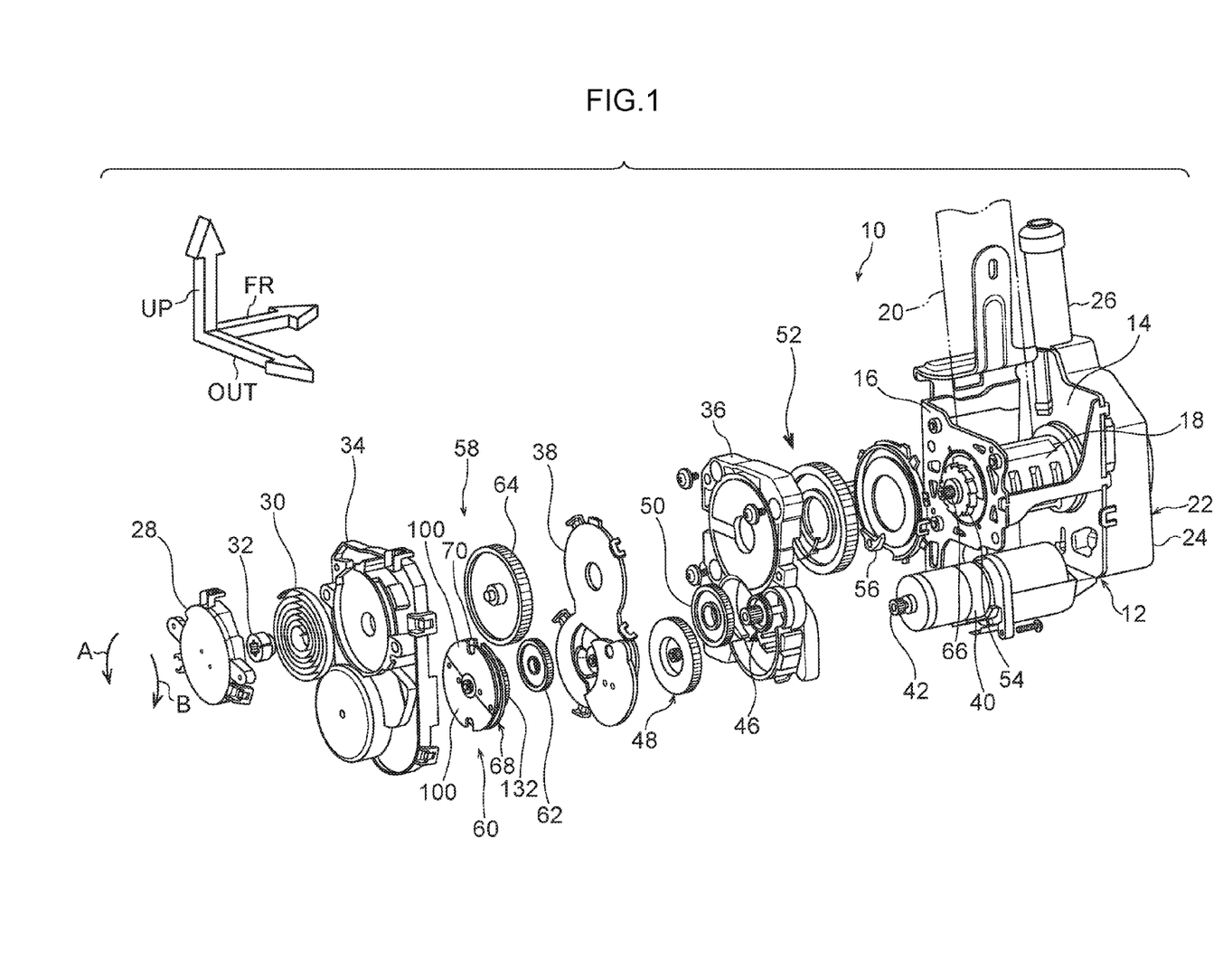
FIG. 1 is an exploded perspective view of a webbing take-up device relating to an exemplary embodiment.

As shown in FIG. 1, the webbing take-up device 10 relating to the present exemplary embodiment has a frame 12. The frame 12 is fixed to the vehicle lower side portion of a center pillar (not shown in the drawings) that serves as the vehicle body of a vehicle. Further, the frame 12 has leg plates 14, 16, and the leg plate 14 and the leg plate 16 face one another substantially in the vehicle front and rear direction.

Further, the present webbing take-up device 10 has a spool 18. The spool 18 is formed substantially in the shape of a cylindrical tube, and is disposed between the leg plate 14 and the leg plate 16 of the frame 12. The central axis direction of the spool 18 runs along the direction in which the leg plate 14 and the leg plate 16 face one another (i.e., substantially the vehicle front and rear direction), and the spool 18 is rotatable around the central axis thereof.

The length direction proximal (base) end portion of a webbing 20 that is shaped as an elongated strip is anchored on the spool 18. When the spool 18 is rotated in a take-up direction (the arrow A direction in FIG. 1), the webbing 20 is taken-up onto the spool 18 from the length direction proximal end side. Further, the length direction distal end side of the webbing 20 extends toward the vehicle upper side from the spool 18. The length direction distal end side of the webbing 20 passes-through a slit hole, which is formed in a through anchor (not shown in the drawings) that is supported by the center pillar at the vehicle upper side of the frame 12, and is folded-back toward the vehicle lower side.

Moreover, the length direction distal end portion of the webbing 20 is anchored on an anchor plate (not shown in the drawings). The anchor plate is formed by a metal plate member of iron or the like, and is fixed to the floor portion (not shown in the drawings) of the vehicle, or the frame member of the seat (not shown in the drawings) that corresponds to the webbing take-up device 10, or the like.

Further, a seatbelt device for a vehicle, to which the present webbing take-up device 10 is applied, has a buckle device (not shown in the drawings). The buckle device is provided at the vehicle transverse direction inner side of the seat to which the present webbing take-up device 10 is applied. The webbing 20 is applied to the body of the vehicle occupant due to a tongue (not shown in the drawings) that is provided at the webbing 20 being engaged with the buckle device in the state in which the webbing 20 is placed around the body of the vehicle occupant who is seated in the seat.

On the other hand, a cover member 24 that structures a locking mechanism 22 is provided at the vehicle front side of the leg plate 14 of the frame 12. Various types of parts that structure a VSIR mechanism or a WSIR mechanism are provided at the inner side of the cover member 24. A VSIR mechanism is operated in a state of sudden deceleration of the vehicle at the time of a vehicle collision or the like. In contrast, a WSIR mechanism is operated due to rotational acceleration, which is in a pull-out direction (the arrow B direction in FIG. 1) that is opposite the take-up direction of the spool 18, exceeding a predetermined magnitude. Due to the VSIR mechanism or the WSIR mechanism being operated, a lock member (not shown in the drawings) that structures the locking mechanism 22 is operated, and rotation of the spool 18 in the pull-out direction is limited.

Further, a pretensioner 26 is provided at the vehicle front side of the leg plate 14. The pretensioner 26 is operated at the time of an emergency of the vehicle, such as the time of a vehicle collision or the like. Due to the pretensioner 26 being operated, the spool 18 is rotated forcibly in the take-up direction (the arrow A direction in FIG. 1). Moreover, a force limiter mechanism is provided at the spool 18. When rotational force of the spool 18 in the pull-out direction exceeds a predetermined magnitude in a state in which rotation of the spool 18 in the pull-out direction (the arrow B direction in FIG. 1) is prevented by the lock member of the locking mechanism 22, the spool 18 is rotated in the pull-out direction while an energy absorbing member of the force limiter mechanism is deformed. The webbing 20 is pulled-out from the spool 18 by the amount of rotation of the spool 18 in the pull-out direction, and some of the rotational force of the spool 18 is provided to the deformation of the energy absorbing member and absorbed.

On the other hand, a spring housing 28 is provided at the vehicle rear side of the leg plate 16 of the frame 12. A power spring 30 that serves as a spool urging member is provided at the inner side of the spring housing 28. The spiral direction outer side end portion of the power spring 30 is anchored directly or indirectly on the spring housing 28. Further, a shaft member 32 is provided at the inner side of the spring housing 28. The spiral direction inner side end portion of the power spring 30 is anchored directly or indirectly on the shaft member 32. The shaft member 32 is disposed coaxially with respect to the spool 18, and is supported by the spring housing 28 so as to rotate freely.

Further, a first gear housing 34 is provided between the spring housing 28 and the leg plate 16 of the frame 12. The spring housing 28 is supported by the first gear housing 34. A second gear housing 36 is provided between the first gear housing 34 and the leg plate 16 of the frame 12. The second gear housing 36 is fixed to the leg plate 16 of the frame 12 by fastening members such as screws or the like. Further, the first gear housing 34 is supported by the leg plate 16 or the second gear housing 36. A plate 38 is provided between the first gear housing 34 and the second gear housing 36. The plate 38 is supported by the first gear housing 34.

On the other hand, the present webbing take-up device 10 has a motor 40 that serves as a driving unit. The motor 40 is provided at the vehicle lower side of the spool 18 between the leg plate 14 and the leg plate 16 of the frame 12. When the motor 40 is electrically connected to a battery (not shown in the drawings) that is installed in the vehicle, the motor 40 is electrically connected to an ECU (not shown in the drawings) that serves as a control section. The ECU is electrically connected to a front side monitoring device (not shown in the drawings) that monitors the region at the front side of the vehicle.

At the front side monitoring device, for example, when radio waves of a millimeter wave radar or the like that are emitted toward the region at the front side of the vehicle are reflected by an obstacle or the like that is at the vehicle front side, the radio waves are received by the front side monitoring device, and the distance from the vehicle to the obstacle at the vehicle front side is computed by the front side monitoring device. In a case in which the distance, which is from the vehicle to the obstacle at the vehicle front side and which has been computed in this way, is less than a predetermined value, an obstacle detection signal that is outputted from the front side monitoring device to the ECU switches from Low level to High level. When the obstacle detection signal that is inputted to the ECU switches from Low level to High level, the motor 40 is driven to rotate forward at a high speed by the ECU.

Further, the ECU is electrically connected to a buckle switch (not shown in the drawings). The buckle switch is provided at the aforementioned buckle that structures the seatbelt device. When the tongue is engaged with the buckle, a tongue detection signal that is outputted from the buckle switch to the ECU switches from Low level to High level. When engagement of the tongue and the buckle is released, the tongue detection signal that is outputted from the buckle switch switches from High level to Low level. When the tongue detection signal that is inputted to the ECU switches from Low level to High level, the motor 40 is driven to rotate forward at a low speed by the ECU. In contrast, when the tongue detection signal that is inputted to the ECU switches from High level to Low level, the motor 40 is driven to rotate reversely by the ECU.

Moreover, an output shaft 42 of the motor 40 extends toward the vehicle rear side from the main body portion of the motor 40. The output shaft 42 of the motor 40 passes-through the leg plate 14 of the frame 12 and enters into the second gear housing 36.

Further, the present webbing take-up device 10 has a first gear train 44 that serves as a first rotational force transmitting section and structures a first transmission path. The first gear train 44 has a first gear 46, a first clutch 48, a second gear 50, and a second clutch 52. The first gear 46, the first clutch 48, the second gear 50 and the second clutch 52 are rotatably provided at the second gear housing 36. The first gear 46 of the first gear train 44 is engaged with the output shaft 42 of the motor 40. When rotational force of the motor 40 is inputted to the first gear 46 via the output shaft 42 due to the motor 40 being driven, the rotational force of the motor 40 is transmitted to the second clutch 52 via the first gear 46, the first clutch 48 and the second gear 50, and the second clutch 52 is rotated.

The second clutch 52 of the first gear train 44 is disposed coaxially with respect to the spool 18. Further, a ratchet wheel 54 is provided at the inner side of the second clutch 52 of the first gear train 44. The ratchet wheel 54 is disposed coaxially with respect to the spool 18 and the second clutch 52. Further, the ratchet wheel 54 is rotated integrally with the spool 18, and can rotate relative to the second clutch 52.

Moreover, the second clutch 52 of the first gear train 44 has a clutch pawl 56. When rotational force of the motor 40 in a case in which the motor 40 is driven to rotate forward is transmitted to the second clutch 52, and, due thereto, main body portion of the second clutch 52 is rotated in the take-up direction (the arrow A direction in FIG. 1), the clutch pawl 56 is rotated in the take-up direction together with the main body portion of the second clutch 52, and engages with the ratchet wheel 54. Due thereto, the ratchet wheel 52 is rotated integrally with the second clutch 52 in the take-up direction, and the spool 18 is rotated in the take-up direction.

In this way, because the first gear train 44 has the second clutch 52, even if, from the state in which the clutch pawl 56 of the second clutch 52 is not engaged with the ratchet wheel 54, the second clutch 52 is rotated in the pull-out direction (the arrow B direction in FIG. 1) or the ratchet wheel 54 is rotated in the take-up direction (the arrow A direction in FIG. 1) or the pull-out direction, rotational force is not transmitted between the second clutch 52 and the ratchet wheel 54.

In contrast, in the state in which the clutch pawl 56 of the second clutch 52 of the first gear train 44 is engaged with the ratchet wheel 54, rotation of the ratchet wheel 54 in the pull-out direction (the arrow B direction in FIG. 1) is transmitted to the second clutch 52 via the clutch pawl 56. Here, when rotational force, which is of a predetermined magnitude or greater and which opposes rotation of the first clutch 48 in a case in which the rotational force of the forward rotational driving of the motor 40 is transmitted via the first gear 46 to the first clutch 48, is inputted from the second clutch 52 via the second gear 50 of the first gear train 44 to the first clutch 48, the first clutch 48 is operated, and the transmission of rotational force between the first gear 46 and the second gear 50 of the first gear train 44 is cut-off by the first clutch 48.

On the other hand, the present webbing take-up device 10 has a second gear train 58 that serves as a second rotational force transmitting section and structure a second transmission path. The second gear train 58 has a third clutch 60, a third gear 62 and a fourth gear 64. The third clutch 60, the third gear 62 and the fourth gear 64 are rotatably provided at the first gear housing 34. The third clutch 60 of the second gear train 58 is engaged with the first clutch 48 of the first gear train 44. The rotational force of the first clutch 48 can be transmitted not only to the second gear 50, but also to the third clutch 60. Moreover, the rotational force that is transmitted to the third clutch 60 can be transmitted via the third gear 62 to the fourth gear 64.

The fourth gear 64 is disposed coaxially with respect to the spool 18, and is connected to the shaft member 32 that is provided at the inner side of the spring housing 28, and relative rotation of the fourth gear 64 with respect to the shaft member 32 is limited. Further, the fourth gear 64 is connected to a connecting shaft 66. The connecting shaft 66 is provided at the side, which is opposite the side at which the spool 18 is provided, (i.e., is provided at the vehicle rear side) of the ratchet wheel 54. The connecting shaft 66 is disposed coaxially with respect to the ratchet wheel 54 and the spool 18, and relatively rotation thereof with respect to the spool 18 is limited. Moreover, relative rotation of the connecting shaft 66 with respect to the fourth gear 64 of the second gear train 58 is limited. Therefore, rotational force is transmitted between the spool 18 and the fourth gear 64.

Figure 2:
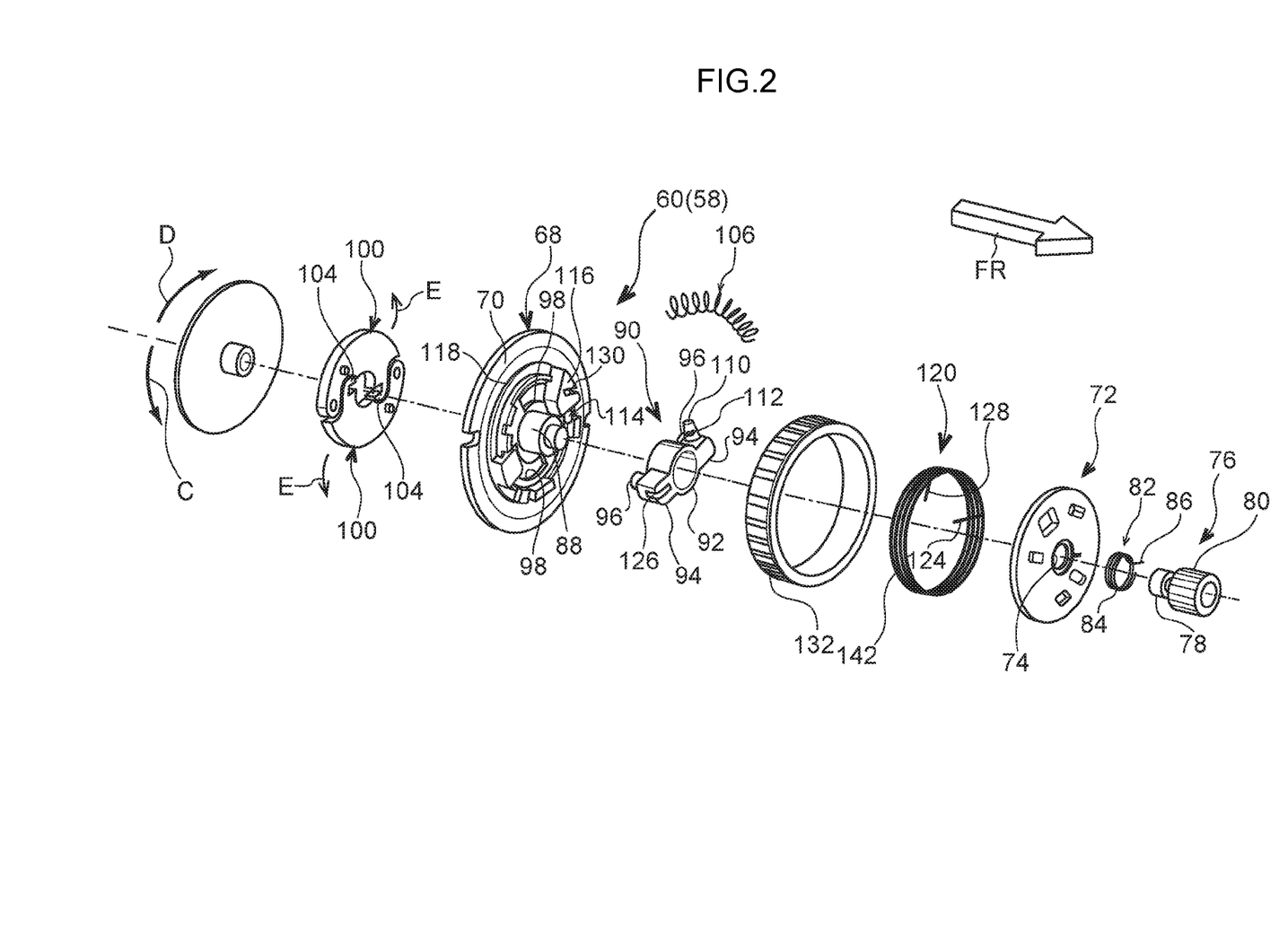
FIG. 2 is an exploded perspective view, from a vehicle front side, of a third clutch of a second gear train.
Figure 3:
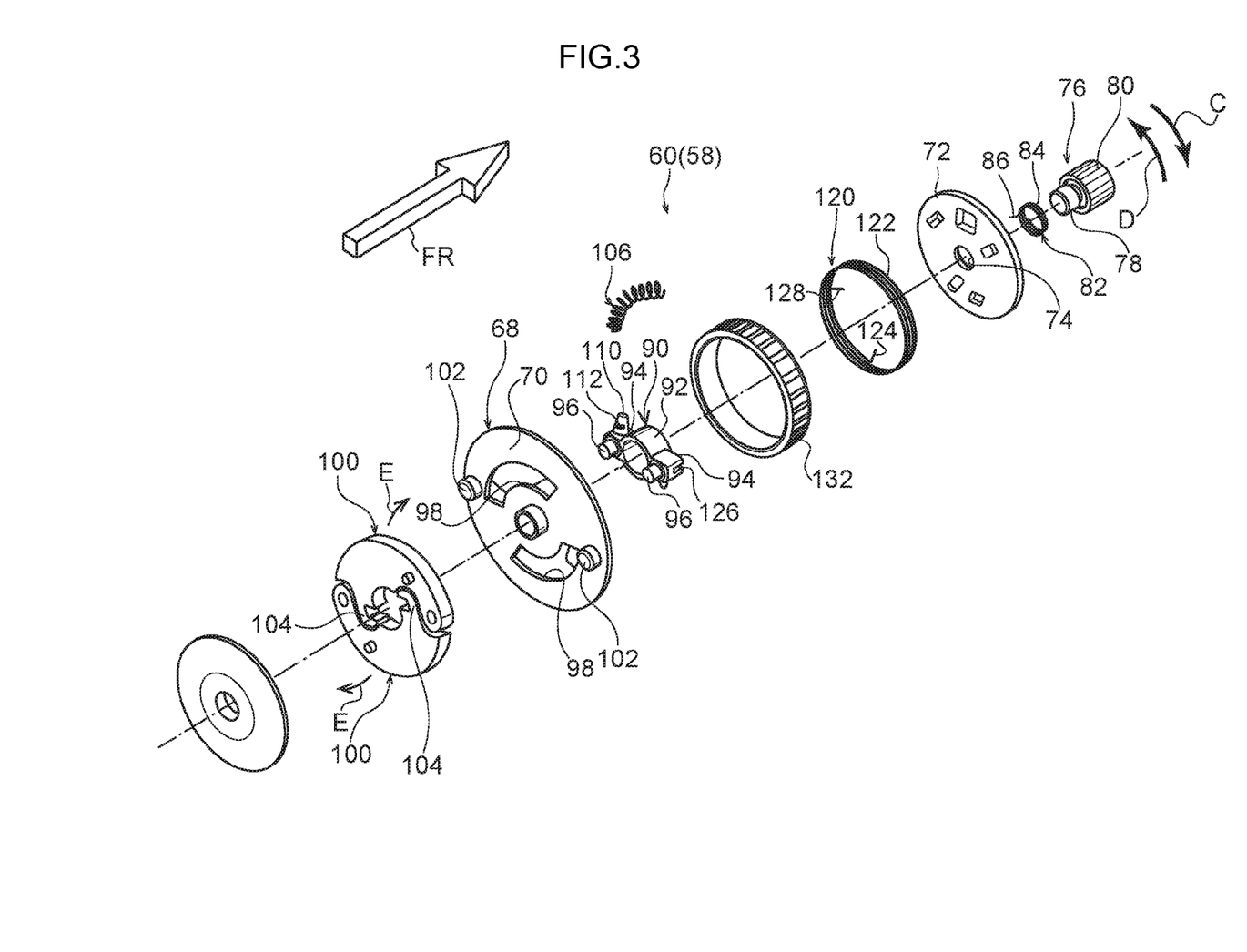
FIG. 3 is an exploded perspective view, from a vehicle rear side, of the third clutch of the second gear train.

On the other hand, as shown in FIG. 2 and FIG. 3, the third clutch 60 has a base 68. The base 68 has a disc portion 70 that is disc shaped. A rotor plate 72 is provided at the vehicle front side of the disc portion 70. The rotor plate 72 is disc shaped, and is provided coaxially with respect to the disc portion 70. Further, the rotor plate 72 is connected to the disc portion 70 at a position that is apart, toward the vehicle front side, from the disc portion 70. Relative rotation and relative movement in the vehicle front and rear direction of the rotor plate 72 with respect to the disc portion 70 are limited.

A supporting hole 74 is formed in the substantial center of the rotor plate 72. A gear shaft portion 78 of an input gear 76 is inserted in the supporting hole 74 of the rotor plate 72. The input gear 76 is supported coaxially with respect to the rotor plate 72, and so as to be able to rotate relatively with respect to the rotor plate 72. A gear portion 80 is provided at the vehicle front side of the gear shaft portion 78 of the input gear 76. The gear portion 80 is disposed coaxially with respect to the gear shaft portion 78, and the gear portion 80 is integral with the gear shaft portion 78.

The gear portion 80 of the input gear 76 is engaged with the first clutch 48 of the first gear train 44. Therefore, when the rotational force at the time when the motor 40 is driven to rotate forward is transmitted via the first clutch 48 to the input gear 76, the input gear 76 is rotated toward one side around the central axis thereof (toward the arrow C direction side in FIG. 2 and FIG. 3). When the rotational force at the time when the motor 40 is driven to rotate reversely is transmitted via the first clutch 48 to the input gear 76, the input gear 76 is rotated toward the another side around the central axis thereof (toward the arrow D direction side in FIG. 2 and FIG. 3).

A first clutch spring 82 is provided at the input gear 76. The first clutch spring 82 is a coil spring. The gear shaft portion 78 of the input gear 76 is disposed at the inner side of a coil portion 84 of the first clutch spring 82. The coil portion 84 of the first clutch spring 82 contacts the outer peripheral surface of the gear shaft portion 78 of the input gear 76. When the input gear 76 is rotated, the first clutch spring 82 is rotated together with the input gear 76 due to the friction between the gear shaft portion 78 of the input gear 76 and the coil portion 84 of the first clutch spring 82. Further, an engaging portion 86 extends from one end of the coil portion 84 of the first clutch spring 82, and the engaging portion 86 of the first clutch spring 82 is engaged with the rotor plate 72. Due thereto, the rotational force of the input gear 76 is transmitted via the first clutch spring 82 to the rotor plate 72, and further, is transmitted to the base 68.

On the other hand, a base shaft portion 88 is provided at the vehicle front side of the disc portion 70 of the base 68. The base shaft portion 88 is formed in the shape of a solid cylinder, and is disposed coaxially with respect to the disc portion 70, and is integral with the disc portion 70. A lever 90 is provided at the base shaft portion 88. The lever 90 has a ring portion 92 that is ring-shaped. The ring portion 92 is supported at the base shaft portion 88 so as to rotate freely around the base shaft portion 88 toward one side (the arrow C direction side in FIG. 2 and FIG. 3) and another side (the arrow D direction side in FIG. 2 and FIG. 3). A pair of lever portions 94 are provided at the ring portion 92 of the lever 90, integrally with the ring portion 92. One of the lever portions 94 is disposed at the radial direction outer side of the ring portion 92. The another lever portion 94 is disposed at the side opposite the one lever portion 94 with the ring portion 92 therebetween.

Further, engaging projections 96 are provided at the vehicle rear sides of the both lever portions 94 of the lever 90. These engaging projections 96 are formed in the shapes of solid cylinders. The vehicle front side ends of the engaging projections 96 are connected to the lever portions 94 of the lever 90 and are integral with the lever portions 94. Moreover, the engaging projections 96 pass-through hole portions 98, which are formed in the disc portion 70 of the base 68, and project-out toward the vehicle rear side of the disc portion 70.

On the other hand, a pair of weights 100 are provided at the vehicle rear side of the disc portion 70 of the base 68. These weights 100 are formed in plate shapes, and the thickness directions of the weights 100 run along the vehicle front and rear direction. Further, as shown in FIG. 3, a pair of supporting shafts 102 are provided at the vehicle rear side of the disc portion 70 of the base 68. These supporting shafts 102 are formed to project-out toward the vehicle rear side from portions in vicinities of the outer peripheral edge portion of the disc portion 70 at the vehicle rear side surface of the disc portion 70 of the base 68. The one supporting shaft 102 is disposed at the opposite side of the another supporting shaft 102, with the center of the disc portion 70 therebetween.

One of the above-described pair of weights 100 is supported by one of the supporting shafts 102 of the disc portion 70 of the base 68, and can rotate around this one supporting shaft 102. In contrast, the another weight 100 is supported by the another supporting shaft 102 of the disc portion 70 of the base 68, and can rotate around this another supporting shaft 102. Therefore, these weights 100 are rotated together with the base 68, and moreover, the weights 100 are rotated toward one sides around the supporting shafts 102 (in the arrow E directions in FIG. 2 and FIG. 3) by the centrifugal force that is due to the rotation of the base 68 around the base shaft portion 88 toward the another side (the arrow D direction side in FIG. 2 and FIG. 3).

Further, engaging claws 104 are formed at these weights 100. The engaging claw 104 of one of the weights 100 is engaged with the engaging projection 96 of one of the lever portions 94 of the lever 90, and the engaging claw 104 of the another weight 100 is engaged with the engaging projection 96 of the another of the lever portions 94 of the lever 90. When the weights 100 are rotated toward one sides around the supporting shafts 102 (in the arrow E directions in FIG. 2 and FIG. 3), the engaging projections 96 of the both lever portions 94 of the lever 90 are pulled by the engaging claws 104 of the weights 100, and, due thereto, the lever 90 is rotated toward one side around the base shaft portion 88 (toward the arrow C direction side in FIG. 2 and FIG. 3).

On the other hand, a return spring 106 is provided at the base 68. The return spring 106 is a compression coil spring, and is disposed at the vehicle front side of the disc portion 70 of the base 68. The total number of turns of the return spring 106 is greater than the effective number of turns. Both end portions 108 of the return spring 106 are end turn portions (end coils) that are other than the effective number of turns. The number of turns at the both end portions 108 of the return spring 106 is at least greater than or equal to two turns.

Figure 4:
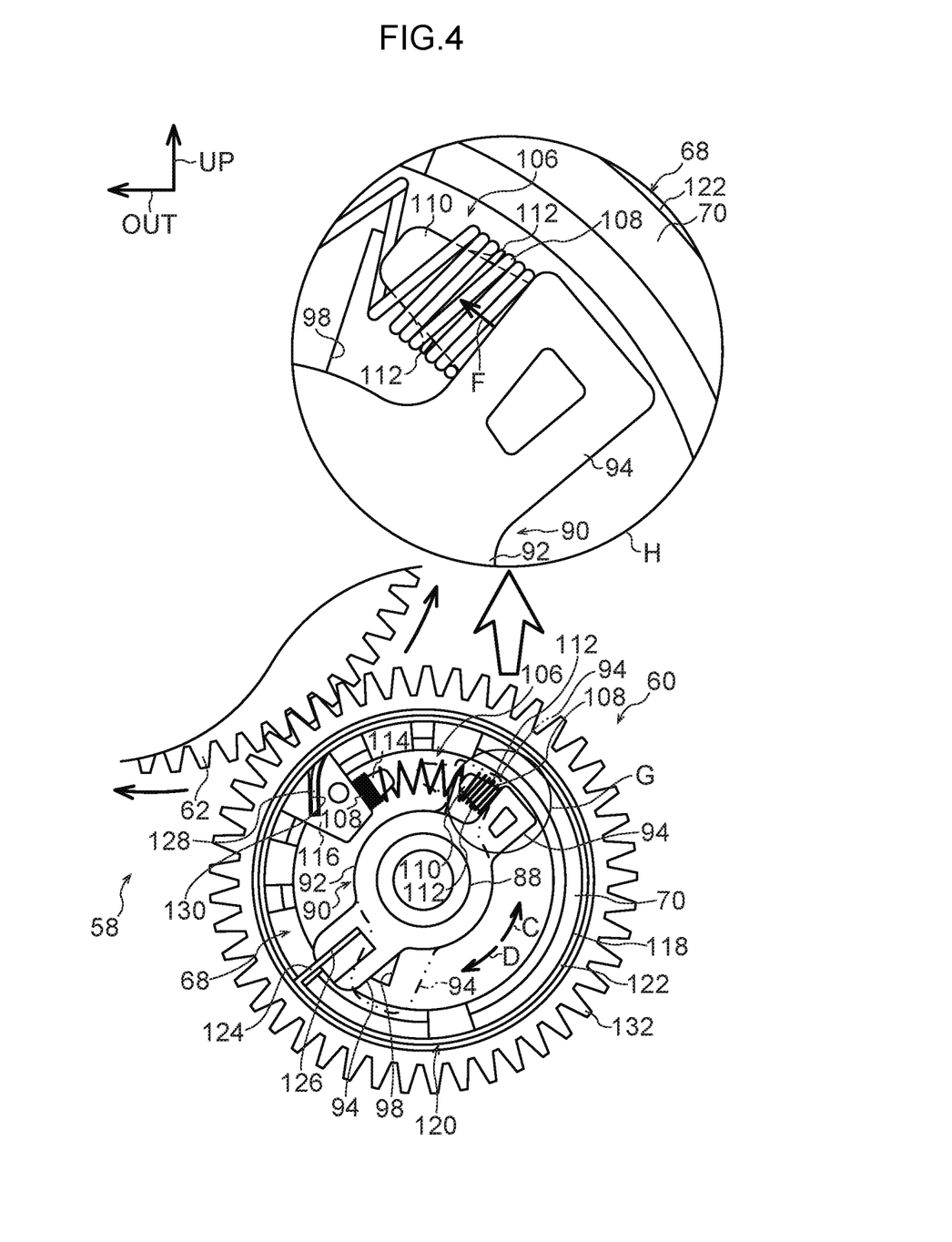
FIG. 4 is a side view of the third clutch of the second gear train that shows a base, a lever, a return spring and a second clutch spring of the third clutch.

As shown in FIG. 4, a first catch projection 110 that is provided at one of the lever portions 94 of the lever 90 is disposed at (entered in) the inner side of one of the end portions 108 of the return spring 106. The first catch projection 110 is shaped as a truncated cone whose outer diameter dimension becomes smaller toward the distal end side. The proximal end of the first catch projection 110 is connected to the surface, which is at one side around the base shaft portion 88 (the arrow C direction side in FIG. 4), of the one lever portion 94 of the lever 90, and the first catch projection 110 is integral with the one lever portion 94. As shown in circle H, in which the portion of circle G is enlarged, in FIG. 4, a pair of flange portions 112 are formed at the first catch projection 110. These flange portions 112 are formed so as to project-out from the first catch projection 110 at an intermediate portion in the direction in which the first catch projection 110 projects-out from the one lever portion 94, in a direction intersecting the direction in which the first catch projection 110 projects-out. One of the flange portions 112 is disposed at the side opposite the another flange portion 112, with the first catch projection 110 therebetween.

In the state in which the first catch projection 110 of the one lever portion 94 of the lever 90 is disposed at the inner side of the one end portion 108 of the return spring 106, the both flange portions 112 that are provided at the first catch projection 110 are disposed (entered) between adjacent turns (between wound portion of one turn and wound portion of one turn) of the one end portion 108 of the return spring 106. Due thereto, movement of the portion, which is further toward the proximal end side of the first catch projection 110 than the flange portions 112 at the one end portion 108 of the return spring 106, toward the distal end side of the first catch projection 110 is limited, and the one end portion 108 of the return spring 106 coming-off of the first catch projection 110 (movement in the arrow F direction in FIG. 4) is suppressed.

In contrast, as shown in FIG. 4, a second catch projection 114 that is provided at the base 68 is disposed at (entered in)

the inner side of the another end portion 108 of the return spring 106. The second anchor projection 214 is shaped as a truncated cone whose outer diameter dimension becomes smaller toward the distal end side, and is formed at a block portion 116 that is provided at the base 68. The block portion 116 is formed at the vehicle front side of the disc portion 70 of the base 68. The second catch projection 114 is connected to the surface, which is at another side around the base shaft portion 88 (the arrow D direction side in FIG. 4), of the block portion 116, and the second catch projection 114 is integral with the block portion 116. Due to the return spring 106 being provided in this way, the lever 90 is urged toward the another side around the base shaft portion 88 with respect to the disc portion 70 of the base 68, and can rotate toward the one side around the base shaft portion 88 (toward the arrow C direction side from FIG. 2 to FIG. 4) against the urging force of the return spring 106.

Further, a spring mounting portion 118 is formed at the disc portion 70 of the base 68. The spring mounting portion 118 is substantially shaped as a disc of a smaller diameter than the disc portion 70, and is formed integrally with the disc portion 70 and coaxially with respect to the disc portion 70 and at the vehicle front side of the disc portion 70. A second clutch spring 120 that serves as a clutch member is provided at the spring mounting portion 118 of the disc portion 70 of the base 68. The second clutch spring 120 is a torsion coil spring. The spring mounting portion 118 is disposed at (entered in) the inner side of a coil portion 122 of the second clutch spring 120, and the second clutch spring 120 is held at the spring mounting portion 118.

One end portion 124 of the second clutch spring 120 is disposed at (entered in) the inner side of a first catch groove 126 that is formed in the another of the pair of lever portions 94 of the lever 90. In contrast, another end portion 128 of the second clutch spring 120 is disposed (entered) in a second catch groove 130 that is formed in the block portion 116 of the disc portion 70 of the base 68. The direction of the coil winding from the one end portion 124 toward the another end portion 128 of the second clutch spring 120 is the one side around the base shaft portion 88 of the base 68 (the arrow C direction side in FIG. 2 and FIG. 3). Therefore, when the lever 90 is rotated toward the one side around the base shaft portion 88 with respect to the base 68, the one end portion 124 of the second clutch spring 120 approaches the another end portion 128 in the direction of winding of the coil portion 122, and, due thereto, the second clutch spring 120 elastically deforms so as to bulge-out (be displaced) toward the radial direction outer side of the coil portion 122.

Figure 5:
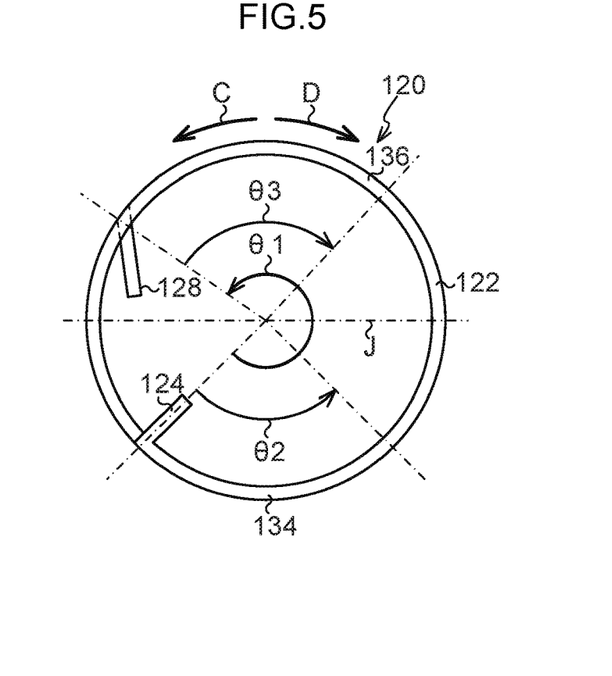
FIG. 5 is a side view in which the second clutch spring is in its natural state.

Here, as shown in FIG. 5, in the natural state of the second clutch spring 120 in which load is not being applied to the second clutch spring 120, angle θ1, when viewed along an axial direction, that the another end portion 128 forms with respect to the one end portion 124 of the second clutch spring 120 in the direction of winding of the coil portion 122 from the one end portion 124 to the another end portion 128 of the second clutch spring 120 is 270° (degrees).

Further, with regard to this angle θ1, in a case in which an angle of the wound portions, wound by the number of turns, at the coil portion 122 of the second clutch spring 120, is included, the angle θ1 is the numerical value obtained by subtracting from the product, which is obtained by multiplying the number of turns at the coil portion 122 by 360°, from the angle, which is formed by the another end portion 128 with respect to the one end portion 124 of the second clutch spring 120 in the direction of winding of the coil portion 122 from the one end portion 124 to the another end portion 128 of the second clutch spring 120, and this numerical value (i.e., the angle θ1) is 270°.

Further, an output gear 132 that serves as a rotating member is provided at the radial direction outer side of the coil portion 122 of the second clutch spring 120. The output gear 132 is formed in the shape of a cylindrical tube. The output gear 132 is disposed coaxially with respect to base 68, and is supported at the base 68 such that relative rotation of the output gear 132 with respect to the base 68 is possible. As described above, the one end portion 124 of the second clutch spring 120 that is provided at the base 68 approaches the another end portion 128 in the direction of winding of the coil portion 122 of the second clutch spring 120, and, due thereto, the second clutch spring 120 elastically deforms so as to bulge-out (be displaced) toward the radial direction outer side of the coil portion 122, and the second clutch spring 120 abuts the inner side portion of the output gear 132, and the rotation of the base 68 is transmitted to the output gear 132 by the friction between the second clutch spring 120 and the inner side portion of the output gear 132. Due thereto, the output gear 132 is rotated.

Namely, when the rotational force at the time when the motor 40 (see FIG. 1) is driven to rotate reversely is inputted to the third clutch 60 via the first clutch 48, the output gear 132 of the third clutch 60 is rotated toward the another side around the base shaft portion 88 of the base 68. However, even if the rotational force at the time when the motor 40 is driven to rotate forward is inputted to the third clutch 60 via the first clutch 48, the output gear 132 of the third clutch 60 is not rotated.

External teeth are formed at the outer peripheral portion of the output gear 132 of the third clutch 60. The external teeth at the outer peripheral portion of the output gear 132 are engaged with the third gear 62 of the second gear train 58. Due thereto, the rotational force, which is transmitted from the first clutch 48 of the first gear train 44 to the third clutch 60 of the second gear train 58, is transmitted to the spool 18 via the third gear 62 and the fourth gear 64.

Further, the rotational force at the time when the motor 40 (see FIG. 1) is driven to rotate forward is transmitted to the spool 18 via the first gear 46, the first clutch 48, the second gear 50 and the second clutch 52 of the first gear train 44. Due thereto, the spool 18 is rotated in the take-up direction (the arrow A direction in FIG. 1). In contrast, the rotational force at the time when the motor 40 is driven to rotate reversely is transmitted to the spool 18 via the first gear 46 and the first clutch 48 of the first gear train 44, and the third clutch 60, the third gear 62 and the fourth gear 64 of the second gear train 58, and, due thereto, the spool 18 is rotated in the take-up direction. Furthermore, the reduction ratio between the output gear 132 of the third clutch 60 and the fourth gear 64 at the second gear train 58 is larger than the reduction ratio between the second gear 50 and the second clutch 52 at the first gear train 44.

(Operation and Effects of Present Exemplary Embodiment)

The operation and effects of the present exemplary embodiment are described next.

In the present exemplary embodiment, at the time when the webbing 20 is to be applied to the body of the vehicle occupant who is seated in the vehicle seat, the webbing 20 is pulled by the vehicle occupant, and, due thereto, the webbing 20 is pulled-out from the spool 18. The webbing 20 that is pulled-out from the spool 18 is placed around toward the vehicle front side of the vehicle occupant by the vehicle occupant, and, in this state, the tongue that is provided at the webbing 20 is engaged with the buckle of the seatbelt device.

When the tongue is engaged with the buckle of the seatbelt device, the tongue detection signal, which is outputted from the buckle switch provided at the buckle and is inputted to the ECU, switches from Low level to High level, and the motor 40 is driven to rotate forward at a low speed by the ECU. The rotational force of the forward rotational driving of the motor 40 is transmitted from the output shaft 42 of the motor 40 to the ratchet wheel 54 via the first gear 46, the first clutch 48, the second gear 50 and the second clutch 52 of the first gear train 44, and the ratchet wheel 54 is rotated in the take-up direction (the arrow A direction in FIG. 1) at a low speed. Due thereto, the spool 18 is rotated in the take-up direction at a low speed, and the webbing 20 is taken-up onto the spool 18. Due thereto, slack of the webbing 20 that has been placed around the body of the vehicle occupant is eliminated, and the webbing 20 is applied to the body of the vehicle occupant.

In such a state in which the webbing 20 is applied to the body of the vehicle occupant, when the distance to an obstacle that is in front of the vehicle that is traveling becomes less than a given value, the obstacle detection signal that is outputted from the front side monitoring device and is inputted to the ECU switches from Low level to High level, and the motor 40 is driven to rotate forward at a high speed by the ECU. The rotational force of the forward rotational driving of the motor 40 is transmitted to the spool 18 via the first gear 46, the first clutch 48, the second gear 50, the second clutch 52 and the ratchet wheel 52 of the first gear train 44. Due thereto, the spool 18 is rotated at a high speed in the take-up direction (the arrow A direction in FIG. 1). Due thereto, the webbing 20 is taken-up onto the spool 18, and slack of the webbing 20 that has been placed around the body of the vehicle occupant is further eliminated, and the body of the vehicle occupant can be restrained strongly by the webbing 20.

On the other hand, when the buckle of the seatbelt device is operated by the vehicle occupant or the like, and the engagement of the tongue and the buckle is released, the tongue detection signal that is outputted from the buckle switch provided at the buckle and that is inputted to the ECU switches from High level to Low level, and the motor 40 is driven to rotate reversely by the ECU. The rotational force of the reverse rotational driving of the motor 40 is transmitted from the output shaft 42 of the motor 40 via the first gear 46 and the first clutch 48 of the first gear train 44 to the input gear 76 of the third clutch 60 of the second gear train 58. Due thereto, the input gear 76 is rotated toward the another side around the base shaft portion 88 of the base 68 (toward the arrow D direction side in FIG. 2 and FIG. 3).

The rotational force of the input gear 76 of the third clutch 60 is transmitted to the base 68 of the third clutch 60 via the first clutch spring 82 and the rotor plate 72 that structure the third clutch 60. Due thereto, the base 68 is rotated toward the another side around the base shaft portion 88 (toward the arrow D direction side in FIG. 2 and FIG. 3). When centrifugal force is applied to the weights 100 of the third clutch 60 due to this rotation of the base 68, the weights 100 are rotated toward one sides around the supporting shafts 102 (in the arrow E directions in FIG. 2 and FIG. 3). When, due to this rotation of the weights 100, the lever 90 of the third clutch 60 is rotated toward one side around the base shaft portion 88 of the base 68 of the third clutch 60 (toward the arrow C direction side in FIG. 2 and FIG. 3) against the urging force of the return spring 106, the one end portion 124 of the second return spring 120 is rotated in the direction of winding of the coil portion 122 that is from the one end portion 124 toward the another end portion 128 of the second clutch spring 120 of the third clutch 60, and the one end portion 124 of the second clutch spring 120 is made to approach the another end portion 128.

Due thereto, the coil portion 122 of the second clutch spring 120 of the third clutch 60 is displaced so as to bulge-out toward the radial direction outer side, and the coil portion 122 of the second clutch spring 120 abuts the inner side portion of the output gear 132 of the third clutch 60. Due thereto, the rotation, toward the another side around the base shaft portion 88, of the input gear 76 of the third clutch 60 is transmitted to the output gear 132 of the third clutch 60 via the base 68 of the third clutch 60 and the coil portion 122 of the second clutch spring 120, and the output gear 132 is rotated toward the another side around the base shaft portion 88 (toward the arrow D direction side in FIG. 2 and FIG. 3).

This rotational force of the output gear 132 of the third clutch 60 is transmitted to the spool 18 via the third gear 62, the fourth gear 64 and the connecting shaft 66 of the second gear train 58, and the spool 18 is rotated in the take-up direction (the arrow A direction in FIG. 1). Due thereto, the webbing 20 is taken-up and stored on the spool 18. In this way, at the present webbing take-up device 10, the webbing 20 is taken-up and stored on the spool 18 due to the rotational force of the reverse rotational driving of the motor 40, and therefore, the urging force of the power spring 30 that is provided at the inner side of the spring housing 28 can be made to be weak. The tight feeling that the vehicle occupant receives from the webbing 20 due to the urging force of the power spring 30 in the state in which the webbing 20 is applied to the body of the vehicle occupant can be lessened.

Figure 6:
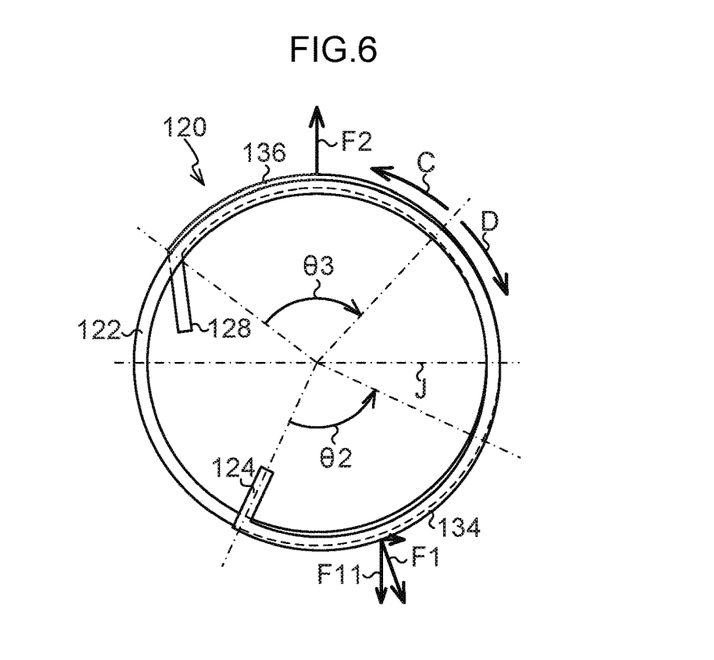
FIG. 6 is a side view that corresponds to FIG. 5 and shows a state in which one end portion of the second clutch spring has been rotated in a direction of winding of a coil portion from the one end portion toward another end portion of the second clutch spring.

By the way, as shown in FIG. 6, at a torsion coil spring such as the second clutch spring 120 of the third clutch 60 of the second gear train 58, when the one end portion 124 of the second clutch spring 120 is rotated in the direction of winding from the one end portion 124 to the another end portion 128 of the second clutch spring 120, and the one end portion 124 is made to approach the another end portion 128, as described above, the coil portion 122 of the second clutch spring 120 is displaced so as to bulge-out toward the radial direction outer side. The displacement of the coil portion 122 of the second clutch spring 120 toward the radial direction outer side is large at one end side portion 134 of the second clutch spring 120 and at another end side portion 136 of the second clutch spring 120.

The one end side portion 134 is a portion of the second clutch spring 120 (the coil portion 122) in a range of a predetermined angle θ2 (e.g., 90°) from the one end portion 124 toward the side in a direction of winding of the coil portion 122 from the one end portion 124 toward the another end portion 128 when viewed along the axial direction, and the another end side portion 136 is a portion of the second clutch spring 120 (the coil portion 122) in a range of a predetermined angle θ3 (e.g., 90°) from the another end portion 128 toward a side in a direction of winding of the coil portion 122 from the another end portion 128 toward the one end portion 124 when viewed along the axial direction.

Here, in the present exemplary embodiment, in the natural state of the second clutch spring 120 in which load is not being applied to the second clutch spring 120, angle θ1, which the one end portion 124 of the second clutch spring 120 forms with respect to the another end portion 128 in the direction of winding of the coil portion 122 around the center of the coil portion 122 of the second clutch spring 120, is greater than or equal to 270° and less than or equal to 360° (preferably, less than 360°), and, in particular, in the present exemplary embodiment, the angle θ1 is 270°. Therefore, as shown in FIG. 5, the one end side portion 134 of the second clutch spring 120 is disposed at the side opposite the another end side portion 136 of the second clutch spring 120 across a one-dot chain (a dashed line) J that passes-through the substantial center of line connecting the one end portion 124 and the another end portion 128 of the second clutch spring 120, and through the center of the coil portion 122 of the second clutch spring 120.

Due thereto, as shown in FIG. 6, when the one end portion 124 of the second clutch spring 120 is rotated in the direction of winding of the coil portion 122 of the second clutch spring 120 from the one end portion 124 toward the another end portion 128 of the second clutch spring 120, and the one end portion 124 of the second clutch spring 120 approaches the another end portion 128, the one end side portion 134 of the second clutch spring 120 is displaced so as to bulge-out toward the side opposite the side of bulging-out of the another end side portion 136 of the second clutch spring 120 (in FIG. 6, the one end side portion 134 is displaced toward one side in the radial direction of the second clutch spring 120, and the another end side portion 136 is displaced toward another side in the radial direction of the second clutch spring 120, the another side in the radial direction being substantially opposite the one side in the radial direction). Therefore, offset in the displacement direction of the bulging-out of the coil portion 122 of the second clutch spring 120 can be suppressed.

Because the coil portion 122 of the second clutch spring 120 is displaced so as to bulge-out in this way, the force F1, which the inner side portion (not shown in FIG. 5 and FIG. 6) of the output gear 132 of the third clutch 60 receives from the one end side portion 134 of the second clutch spring 120, has a component F11 that is in the same direction as force F2 that the inner side portion of the output gear 132 receives from the another end side portion 136 of the second clutch spring 120 (acting direction of F2 and acting direction of F11 are opposite to each other). Due thereto, a portion or all of the force F2 is cancelled-out by the component F11 of the force F1, and the center of the output gear 132 being moved by the force, which is received from the coil portion 122 of the second clutch spring 120 and is directed toward the radial direction outer side of the coil portion 122, can be suppressed. The center of the output gear 132 shifting from the center of the disc portion 70 of the base 68 of the third clutch 60 can be suppressed.

Due thereto, the engagement of the output gear 132 of the third clutch 60 of the second gear train 58 and the third gear 62 of the second gear train 58 can be maintained good. Therefore, friction between at least one of the output gear 132, the third gear 62 and the fourth gear 64, and the axially supporting portion thereof, can be suppressed.

Further, the coil portion 122 of the second clutch spring 120 of the third clutch 60 being displaced in a manner of being offset toward one specific direction can be suppressed. Therefore, the transmission of rotational force (the transmission of rotational torque) from the coil portion 122 of the second clutch spring 120 via the output gear 132 of the third clutch 60 to the third gear 62 of the second gear train 58 can be made to be stable, and the stability of the taking-up of the webbing 20 by the spool 18 that is due to the rotational force of the reverse rotational driving of the motor 40 can be improved.

On the other hand, at the present webbing take-up device 10, the first catch projection 110, which is formed at the one lever portion 94 of the lever 90 of the third clutch 60, is disposed at the inner side of the one end portion 108 of the return spring 106 of the third clutch 60, and moreover, the pair of flange portions 112 that are provided at the first catch projection 110 are disposed between turns (between wound portion of one turn and wound portion of one turn) that are adjacent to one another at the one end portion 108 of the return spring 106. Due thereto, the portion, which is further toward the proximal end side of the first catch projection 110 than the flange portions 112 at the one end portion 108 of the return spring 106, moving toward the distal end side of the first catch projection 110 is limited, and the one end portion 108 of the return spring 106 coming-off of the first catch projection 110 can be suppressed.

Therefore, at the time when the lever 90 is assembled to the base 68 of the third clutch 60 in the state in which the return spring 106 has been assembled to the lever 90 of the third clutch 60, the return spring 106 falling-off of the lever 90 can be suppressed effectively. Due thereto, the workability of the assembling of the third clutch 60 can be improved.

Further, as described above, at the time when the lever 90 of the third clutch 60 is assembled to the base 68 of the third clutch 60, the return spring 106 compressively deforms. In this state, the second catch projection 114 of the disc portion 70 of the base 68 is made to be disposed at the inner side of the another end portion 108 of the return spring 106. At this time, coming-off of the return spring 106 from the first catch projection 110 of the one lever portion 94 of the lever 90, by the restoring force (the flexing load) that is against the compressive deformation of the return spring 106, is suppressed. Due thereto, the workability of assembling the third clutch 60 can be improved.

Moreover, the pair of flange portions 112, which are provided at the first catch projection 110 of the one lever portion 94 of the lever 90, are disposed between turns (wound portions of one turns) that are adjacent to one another at the one end portion 108 of the return spring 106. Here, the end portions 108 of the return spring 106 are end turn portions (end coils) that are other than the effective number of turns of the return spring 106. Therefore, influence on the spring characteristic of the return spring 106 due to the flange portions 112 being disposed between turns that are adjacent to one another at the end portion 108 of the return spring 106 can be suppressed.

Note that, in the present exemplary embodiment, in the natural state of the second clutch spring 120 in which load is not being applied to this second clutch spring 120 of the third clutch 60 of the second gear train 58, the angle θ1 that the one end portion 124 of the second clutch spring 120 forms with respect to the another end portion 128 in the direction of winding of the coil portion 122 around the center of the coil portion 122 is 270°. However, this angle θ1 is not limited to 270°, and the angle θ1 is preferably set in a range of greater than or equal to 270° to less than or equal to 360°. However, to describe further, the angle θ1 is not particularly limited provided that, at the time when the one end portion 124 of the second clutch spring 120 is rotated in the direction of winding of the coil portion 122 from the one end portion 124 toward the another end portion 128 of the second clutch spring 120, the displacement direction toward the radial direction outer side at the one end side portion 134 of the second clutch spring 120 is the side opposite the displacement direction toward the radial direction outer side at the another end side portion 136 of the second clutch spring 120.

Further, in the present exemplary embodiment, there is a structure in which the second clutch spring 120 that serves as a clutch member is disposed at the inner side of the output gear 132 that is ring-shaped and serves as a rotating member, and the one end side portion 134 and the another end side portion 136 of the second clutch spring 120, displaced so as to bulge-out toward the radial direction outer side of the coil portion 122 of the second clutch spring 120, abut the inner side portion of the output gear 132.

However, for example, there may be a structure in which a rotating member is disposed at the inner side of the second clutch spring 120 that serves as the clutch member, and due to the one end portion 124 of the second clutch spring 120 being rotated with respect to the another end portion 128 in the direction opposite the direction of winding of the coil portion 122 from the one end portion 124 toward the another end portion 128 of the second clutch spring 120, the one end side portion 134 and the another end side portion 136 of the second clutch spring 120 are displaced toward the radial direction inner side of the coil portion 122, and, due thereto, the one end side portion 134 and the another end side portion 136 of the second clutch spring 120 abut the outer peripheral portion of the rotating member.

Moreover, in the present exemplary embodiment, there is a structure in which the transmission paths of rotational force from the motor 40 to the spool 18 are the two paths that are the first transmission path that is structured by the first gear train 44 and the second transmission path that branches-off from the first gear train 44 to the second gear train 58. However, the present disclosure may be applied to a structure in which there is one transmission path of rotational force of the motor 40 to the spool 18, or the present disclosure may be applied to a structure in which there are three or more transmission paths of rotational force from the motor 40 to the spool 18.

Further, in the present exemplary embodiment, the present disclosure is applied to a structure in which rotational force is transmitted from the motor 40 to the spool 18. However, the present disclosure may be applied to a transmission path of rotational force that transmits rotational force from the spool 18 to another section.

What is claimed is:

1. A webbing take-up device comprising:
    a clutch member having a coil shape and, due to rotational force being inputted to the clutch member, one end portion of the clutch member being displaced toward one side in a peripheral direction of the clutch member with respect to another end portion of the clutch member, another end side portion of the clutch member being displaced toward another side in a radial direction of the clutch member, and one end side portion of the clutch member being displaced toward one side in the radial direction, which is opposite to the another side in the radial direction;
    a rotating member, at whose inner side the clutch member is disposed, that is abutted by the one end side portion and the another end side portion of the clutch member, which have been displaced toward the one side in the radial direction and the another side in the radial direction, respectively, and to which the rotational force is transmitted via the clutch member; and
    a spool that takes up the webbing by being rotated in a take-up direction, and that enables transmission of rotational force between the spool and the rotating member or the clutch member,
    wherein an angle of the one end portion with respect to the another end portion of the clutch member in a direction of winding of the clutch member from the one end portion toward the another end portion of the clutch member is greater than or equal to 270° and less than or equal to 360°.

2. The webbing take-up device of claim 1, wherein the one end side portion is a portion in a range of a predetermined angle from the one end portion toward a direction of winding of the clutch member from the one end portion toward the another end portion, and the another end side portion is a portion in a range of a predetermined angle from the another end portion toward a direction of winding of the clutch member from the another end portion toward the one end portion.

3. The webbing take-up device of claim 1, wherein the one end side portion is a portion in a range of a predetermined angle from the one end portion toward a direction of winding of the clutch member from the one end portion toward the another end portion, and the another end side portion is a portion in a range of a predetermined angle from the another end portion toward a direction of winding of the clutch member from the another end portion toward the one end portion.

4. A webbing take-up device comprising:
    a clutch member having a coil shape and, due to rotational force being inputted to the clutch member, one end portion of the clutch member being displaced toward one side in a peripheral direction of the clutch member with respect to another end portion of the clutch member, another end side portion of the clutch member being displaced toward another side in a radial direction of the clutch member, and one end side portion of the clutch member being displaced toward one side in the radial direction, which is opposite to the another side in the radial direction;
    a first rotating member, at whose inner side the clutch member is disposed, that is abutted by the one end side portion and the another end side portion of the clutch member, which have been displaced toward the one side in the radial direction and the another side in the radial direction, respectively, and to which the rotational force is transmitted via the clutch member;
    a second rotating member that is different from the first rotating member;
    a third rotating member that is rotatably supported at the second rotating member; and
    a spool that takes up the webbing by being rotated in a take-up direction, and that enables transmission of rotational force between the spool and the first rotating member or the clutch member,
    wherein:
        one of the one end portion or the other end portion is disposed at one of the second rotating member or the third rotating member,
        the other of the one end portion or the other end portion is disposed at the other of the second rotating member or the third rotating member, and
        an angle of the one end portion with respect to the other end portion of the clutch member in a direction of winding of the clutch member from the one end portion toward the other end portion of the clutch member is greater than or equal to 270° and less than or equal to 360°.

5. The webbing take-up device of claim 4, wherein the second rotating member transmits the rotational force to the clutch member.

* * * * *